(12) United States Patent
Nichol et al.

(10) Patent No.: US 8,764,262 B2
(45) Date of Patent: Jul. 1, 2014

(54) ILLUMINATION VIA FLEXIBLE THIN FILMS

(75) Inventors: Anthony John Nichol, Chicago, IL (US); Shawn Michael Pucylowski, Chicago, IL (US)

(73) Assignee: FLEx Lighting II, LLC, Chicago, IL (US)

( * ) Notice: Subject to any disclaimer, the term of this patent is extended or adjusted under 35 U.S.C. 154(b) by 222 days.

(21) Appl. No.: 13/145,860

(22) PCT Filed: Jan. 26, 2010

(86) PCT No.: PCT/US2010/022066
§ 371 (c)(1),
(2), (4) Date: Jul. 22, 2011

(87) PCT Pub. No.: WO2010/085787
PCT Pub. Date: Jul. 29, 2010

(65) Prior Publication Data
US 2011/0273901 A1      Nov. 10, 2011

Related U.S. Application Data

(60) Provisional application No. 61/147,215, filed on Jan. 26, 2009, provisional application No. 61/147,237, filed on Jan. 26, 2009.

(51) Int. Cl.
*A41F 1/00* (2006.01)
(52) U.S. Cl.
USPC ........... 362/581; 362/191; 362/284; 362/368; 362/621
(58) Field of Classification Search
USPC .......................... 362/581, 191, 284, 368, 621
See application file for complete search history.

(56) References Cited

U.S. PATENT DOCUMENTS

| 2,732,688 A | 1/1956 | Dickson |
| 3,535,537 A | 10/1970 | Powell |
| 3,933,556 A | 1/1976 | Strack |

(Continued)

FOREIGN PATENT DOCUMENTS

| CN | 1206661 | 2/1999 |
| CN | 1981221 | 6/2007 |

(Continued)

OTHER PUBLICATIONS

Office action dated Dec. 6, 2012 by the USPTO for U.S. Appl. No. 13/088,231.

(Continued)

*Primary Examiner* — Vip Patel
(74) *Attorney, Agent, or Firm* — Quarles & Brady LLP

(57) ABSTRACT

A film sheet having a series of strips extending from an edge may have the film strips gathered and folded into a stacked array wherein the strips are in parallel abutment. The collected ends of the stacked strips are then suitable for receiving light for transmission into (and emission from) the body of the film sheet. A pair of frame members, when urged toward each other about the strips, may automatically collect and fold the strips into a parallel spaced array. This array may then be gathered by hand, or by a cover member translating adjacent the frame members, to generate the stacked array of parallel abutting strips. The resulting illumination device is particularly useful for illumination of display panels such as liquid crystal displays, organic light-emitting diode displays, or simply signs formed of paper, plastic, and/or other materials.

24 Claims, 5 Drawing Sheets

(56) References Cited

U.S. PATENT DOCUMENTS

| | | |
|---|---|---|
| 4,026,693 A | 5/1977 | Sato |
| 4,151,582 A | 4/1979 | Grunberger |
| 4,228,267 A | 10/1980 | Higashizume et al. |
| 4,389,698 A | 6/1983 | Cibie |
| 4,422,719 A | 12/1983 | Orcutt |
| 4,511,215 A | 4/1985 | Butler |
| 4,551,985 A | 11/1985 | Kovach |
| 4,667,481 A | 5/1987 | Watanabe et al. |
| 4,824,194 A | 4/1989 | Karasawa |
| 4,869,570 A | 9/1989 | Yokohama |
| 5,009,483 A | 4/1991 | Rockwell, III |
| 5,106,181 A | 4/1992 | Rockwell, III |
| 5,134,857 A | 8/1992 | Burley |
| 5,165,187 A | 11/1992 | Shahidi-Hamedani et al. |
| 5,315,673 A | 5/1994 | Stetter et al. |
| 5,328,376 A | 7/1994 | West |
| 5,379,539 A | 1/1995 | Hannula |
| 5,390,436 A | 2/1995 | Ashall |
| 5,506,929 A | 4/1996 | Tai et al. |
| 5,544,268 A | 8/1996 | Bischel |
| 5,596,671 A | 1/1997 | Rockwell, III |
| 5,661,839 A | 8/1997 | Whitehead |
| 5,737,472 A | 4/1998 | Bernasson et al. |
| 5,789,710 A | 8/1998 | Vanderpoel |
| 5,818,554 A | 10/1998 | Hiyama et al. |
| 5,888,324 A | 3/1999 | Nakamura |
| 5,938,991 A | 8/1999 | Pollock |
| 6,049,641 A | 4/2000 | Deacon |
| 6,068,381 A | 5/2000 | Ayres |
| 6,208,788 B1 | 3/2001 | Nosov |
| RE37,186 E | 5/2001 | Hill |
| 6,224,269 B1 | 5/2001 | Engstrand et al. |
| 6,315,433 B1 | 11/2001 | Cavello |
| 6,490,090 B1 | 12/2002 | Kumazawa |
| 6,490,401 B2 | 12/2002 | Cornelissen et al. |
| 6,498,882 B1 | 12/2002 | Buckelew et al. |
| 6,577,359 B2 | 6/2003 | Ishihara |
| 6,592,233 B1 | 7/2003 | Parikka |
| 6,641,880 B1 | 11/2003 | Deyak et al. |
| 6,700,054 B2 | 3/2004 | Cherney et al. |
| 6,750,996 B2 | 6/2004 | Jagt et al. |
| 6,825,895 B2 | 11/2004 | Nakano et al. |
| 6,847,424 B2 | 1/2005 | Gotoh et al. |
| 6,964,226 B2 | 11/2005 | Weiss et al. |
| 7,004,610 B2 | 2/2006 | Yamashita et al. |
| 7,108,414 B2 | 9/2006 | McCollum et al. |
| 7,190,425 B2 | 3/2007 | Hong |
| 7,237,396 B1 | 7/2007 | Nichol |
| 7,406,245 B2 | 7/2008 | Page et al. |
| 7,430,355 B2 | 9/2008 | Heikenfeld et al. |
| 7,452,120 B2 | 11/2008 | Lee et al. |
| 7,457,509 B2 | 11/2008 | Haenen et al. |
| 7,490,967 B2 | 2/2009 | Syribeys |
| 7,534,022 B2 | 5/2009 | Chou |
| 7,542,635 B2 | 6/2009 | Coleman |
| 7,565,054 B2 | 7/2009 | Rinko |
| 7,582,000 B2 | 9/2009 | Pendlebury et al. |
| 7,635,202 B2 | 12/2009 | Awabayashi |
| 7,639,916 B2 | 12/2009 | Fine |
| 7,729,941 B2 | 6/2010 | Zampini, II et al. |
| 7,742,120 B2 | 6/2010 | Bayley et al. |
| 7,750,886 B2 | 7/2010 | Sampsell |
| 7,751,663 B2 | 7/2010 | Van Ostrand |
| 7,773,849 B2 | 8/2010 | Shani |
| 7,780,329 B2 | 8/2010 | McCollum et al. |
| 8,013,831 B2 | 9/2011 | Sampsell |
| 8,128,271 B2 | 3/2012 | Nichol |
| 8,164,703 B2 | 4/2012 | Cheng |
| 8,167,461 B2 | 5/2012 | Nichol |
| 8,434,909 B2 | 5/2013 | Nichol et al. |
| 2002/0015563 A1 | 2/2002 | Murakami |
| 2002/0028600 A1 | 3/2002 | Kondo |
| 2003/0016930 A1 | 1/2003 | Inditsky |
| 2003/0174953 A1 | 9/2003 | Carnevale et al. |
| 2003/0198456 A1 | 10/2003 | Steiner |
| 2004/0093779 A1 | 5/2004 | Blach |
| 2004/0228104 A1 | 11/2004 | Birman |
| 2005/0072032 A1 | 4/2005 | McCollum et al. |
| 2005/0091886 A1 | 5/2005 | Kim |
| 2005/0219148 A1 | 10/2005 | Bayley et al. |
| 2006/0007108 A1 | 1/2006 | Utsumi et al. |
| 2006/0008205 A1 | 1/2006 | Meir et al. |
| 2006/0024017 A1 | 2/2006 | Page et al. |
| 2006/0061008 A1 | 3/2006 | Karner et al. |
| 2006/0105149 A1 | 5/2006 | Donahue |
| 2006/0120106 A1 | 6/2006 | Kuki |
| 2006/0207134 A1 | 9/2006 | Harry |
| 2006/0215958 A1 | 9/2006 | Yeo et al. |
| 2006/0269213 A1 | 11/2006 | Hwang et al. |
| 2007/0002578 A1 | 1/2007 | Furusawa et al. |
| 2007/0014110 A1 | 1/2007 | Itaya |
| 2007/0031097 A1 | 2/2007 | Heikenfeld et al. |
| 2007/0081360 A1 | 4/2007 | Bailey et al. |
| 2007/0086712 A1 | 4/2007 | Shani |
| 2007/0133935 A1 | 6/2007 | Fine |
| 2007/0153545 A1 | 7/2007 | Lee |
| 2007/0171330 A1 | 7/2007 | Hung |
| 2007/0274091 A1 | 11/2007 | Inditsky |
| 2007/0280593 A1 | 12/2007 | Brychell et al. |
| 2007/0286562 A1 | 12/2007 | Inditsky |
| 2008/0007965 A1 | 1/2008 | Kanade et al. |
| 2008/0025039 A1 | 1/2008 | Guillermo |
| 2008/0031579 A1 | 2/2008 | Enami et al. |
| 2008/0037284 A1 | 2/2008 | Rudisill |
| 2008/0043490 A1 | 2/2008 | Coleman et al. |
| 2008/0048366 A1 | 2/2008 | Durney |
| 2008/0148753 A1 | 6/2008 | Welker et al. |
| 2008/0159693 A1 | 7/2008 | Chang |
| 2008/0266863 A1 | 10/2008 | Rinko |
| 2009/0059618 A1 | 3/2009 | Onikiri et al. |
| 2009/0172978 A1 | 7/2009 | Steenblick et al. |
| 2009/0173654 A1 | 7/2009 | Steenblick et al. |
| 2009/0207632 A1 | 8/2009 | McCollum et al. |
| 2009/0257215 A1 | 10/2009 | Gomi |
| 2010/0014311 A1 | 1/2010 | Danieli |
| 2010/0040986 A1 | 2/2010 | Yamaguchi |
| 2010/0067254 A1 | 3/2010 | Ohta et al. |
| 2010/0156953 A1 | 6/2010 | Nevitt |
| 2010/0214786 A1 | 8/2010 | Nichol |
| 2010/0258419 A1 | 10/2010 | Chung et al. |
| 2011/0032724 A1 | 2/2011 | Kinoshita |
| 2011/0176325 A1 | 7/2011 | Sherman et al. |
| 2011/0227487 A1 | 9/2011 | Nichol et al. |
| 2011/0255303 A1 | 10/2011 | Nichol et al. |
| 2011/0273906 A1 | 11/2011 | Nichol et al. |
| 2011/0277361 A1 | 11/2011 | Nichol et al. |
| 2011/0283576 A1 | 11/2011 | Nichol |
| 2011/0286234 A1 | 11/2011 | Nichol |
| 2012/0287674 A1 | 11/2012 | Nichol et al. |
| 2013/0155723 A1 | 6/2013 | Coleman |
| 2013/0250618 A1 | 9/2013 | Nichol et al. |
| 2013/0314942 A1 | 11/2013 | Nichol et al. |

FOREIGN PATENT DOCUMENTS

| | | |
|---|---|---|
| CN | 1985202 | 6/2007 |
| CN | 200962289 Y | 10/2007 |
| CN | 101140335 A1 | 3/2008 |
| EP | 284098 A1 | 9/1988 |
| EP | 1760502 A1 | 3/2007 |
| GB | 198085 | 5/1923 |
| GB | 662514 | 12/1951 |
| JP | 2000141997 A | 5/2000 |
| JP | 2000147218 A | 5/2000 |
| JP | 2000-258633 | 9/2000 |
| JP | 2001243818 | 9/2001 |
| JP | 2001266626 A | 9/2001 |
| JP | 2004199967 A | 7/2004 |
| JP | 2005340160 A | 8/2005 |
| JP | 2006-024561 | 1/2006 |
| JP | 2006310112 A | 11/2006 |
| JP | 2007053054 A | 3/2007 |
| WO | 2006131924 A2 | 12/2006 |
| WO | 2007081862 A2 | 7/2007 |

(56) References Cited

FOREIGN PATENT DOCUMENTS

| WO | 2007143383 A2 | 12/2007 |
|---|---|---|
| WO | 2009048863 A1 | 4/2009 |
| WO | 2010005655 A2 | 1/2010 |
| WO | 2011130715 A2 | 10/2011 |
| WO | 2011130718 A2 | 10/2011 |
| WO | 2011130720 A2 | 10/2011 |
| WO | 2012016047 A1 | 2/2012 |
| WO | 2012068543 | 5/2012 |
| WO | 2012088315 A1 | 6/2012 |
| WO | 2012122511 A1 | 9/2012 |
| WO | 2012158460 A1 | 11/2012 |

OTHER PUBLICATIONS

Notice of allowance dated Jan. 7, 2013 by the USPTO for U.S. Appl. No. 13/089,311.
Office action dated Mar. 5, 2013 by the Japan Patent Office for application No. 2010-528972.
Office action dated May 15, 2012 by the USPTO for U.S. Appl. No. 12/682,387.
Office action dated Dec. 23, 2011 by the USPTO for U.S. Appl. No. 12/682,387.
Office action dated Jul. 23, 2012 by IP Australia for application No. 2010206525.
Office action dated Nov. 22, 2012 by Instituto Mexicano de la Propiedad Industrial for application MX/a/2011/007770.
European Search Report and Written Opinion for European Application No. EP08838526 dated Sep. 19, 2012 including English language translation of the Abstract and computer translation of JP 2005-340160.
International Search Report for International Application No. PCT/US2012/028578 dated Jun. 28, 2012.
International Search Report for International Application No. PCT/US2012/37317 dated Aug. 22, 2012.
Office Action dated Sep. 10, 2012 by the State Intellectual Property Office of China for Application No. CN201080005385.0.
Written Opinion of the International Searching Authority for International Application No. PCT/US2012/028578 dated Jun. 28, 2012.
Written Opinion of the International Searching Authority for International Application No. PCT/US2012/37317 dated Aug. 22, 2012.
Rizzo, et al., "The recovery after bending of polycarbonate sheets." Rheol. Acta 20, 133-138 (1981), ISSN 0035-4511, p. 138, in 1-2.
Lee et al., "LED Light Coupler Design for a Ultra Thin Light Guide," Journal of the Optical Society of Korea, vol. 11, No. 3, Sep. 2007, pp. 113-117.
Chien et al., "The study of LED uniform lightguide for liquid crystal display backlight applications," Tatung University white paper, Taipei, Taiwan, 2008.
Siitonen et al., "Coupling of light from an LED into a thin light guide by diffractive gratings," Applied Optics, vol. 43, No. 30, Oct. 2004, 5631-5636.
Murata et al., "Input couplers for thin light-guides and light-emitting diodes," Optical Engineering 47(2), Feb. 2008, 027001-027007.
Kim, Joon-Sung, et al. "Stacked Polymeric Multimode Waveguide Arrays for Two-Dimensional Optical Interconnects", Journal of Lightwave Technology, p. 840, Mar. 2004.
Luminus Devices PhlatLight Data Sheet, PDS-001022 Rev 05, 2009.
International Search Report for International Application No. PCT/US08/79041, dated Jan. 8, 2009.
Cardinal Intellectual Property's search report (Work order 5874.5) including the results of a search for the features of the claims included in the U.S. patent application entitled "Light Coupling Into Films", inventor: Anthony Nichol, and having assigned U.S. Appl. No. 13/206,210. The foregoing U.S. patent application is a continuation of U.S. Appl. No. 12/682,387.
Cardinal Intellectual Property's supplemental search report dated Nov. 7, 2011 (Work order 5874.6) including the results of a search for the features of the claims included in the U.S. patent application entitled "Method of Manufacturing a Light Emitting Device", inventor: Anthony Nichol, and having assigned U.S. Appl. No. 13/210,622. The foregoing U.S. patent application is a continuation of U.S. Appl. No. 12/682,387.
International Search Report for International Application No. PCT/US11/032797 dated Nov. 7, 2011.
Written Opinion of the International Searching Authority for International Application No. PCT/US11/032797 dated Nov. 7, 2011.
International Search Report for International Application No. PCT/US11/032795 dated Nov. 16, 2011.
Written Opinion of the International Searching Authority for International Application No. PCT/US11/032795 dated Nov. 16, 2011.
International Search Report for International Application No. PCT/US11/032792 dated Nov. 17, 2011.
Written Opinion of the International Searching Authority for International Application No. PCT/US11/032792 dated Nov. 17, 2011.
Written Opinion of the International Searching Authority for International Application No. PCT/US08/079041 dated Jan. 8, 2009.
Written Opinion of the International Searching Authority for International Application No. PCT/US11/066596 dated May 7, 2012.
Written Opinion of the International Searching Authority for International Application No. PCT/US10/22066 dated Mar. 22, 2010.
International Search Report for International Application No. PCT/US11/045730 dated Dec. 23, 2011.
Written Opinion of the International Searching Authority for International Application No. PCT/US11/045730 dated Dec. 23, 2011.
International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Cardinal Intellectual Property's search report dated Mar. 21, 2011 (Work Order 5874.6) including the results of a search for the features of the claims included in the U.S. patent application entitled "Method of Manufacturing a Light Emitting Device," inventor: Anthony Nichol. The foregoing U.S. Patent application is a continuation of U.S. Appl. No 12/682,387.
Buchner, Diplomarbeit: Kinetmatics of 3D Folded Structures for Nanostructured Origami, Department of Mechanical Engineering, 3D optical Systems Group, Massachusetts Institute of Technology, 2003.
Nichol, A.J.; Barbastathis, G., "Sub-30nm alignment accuracy between layered photonic nanostructures using optimized V nanomagnet arrays," Optical MEMs and Nanophotonics, 2008 IEEE/LEOS Internationall Conference on, vol., no., pp. 9,10, Aug. 11-14, 2008.
Arora et al., "Membrane folding to achieve three-dimensional nanostructures: Nanopatterned silicon nitride folded with stressed chromium hinges," Appl. Phys. Lett. 88, 053108 (2006).
"Nanostructured Origami Folding of Patternable Resist for 3D Lithography," Se Young Yang, Hyung-ryul Johnny Choi, Martin Deterre, George Barbastathis, IEEE 2010 International Conference on Optical Mems & Nanophotonics, p. 37-38, Aug. 2010.
Notice of allowance dated Jul. 29, 2013 by the China Patent Office for application No. 201080005385.0.
Office action dated Jun. 20, 2013 by Instituto Mexicano de la Propiedad Industrial for application MX/a/2012/012033.
Office action dated Jun. 26, 2013 by Instituto Mexicano de la Propiedad Industrial for application MX/a/2012/012034.
Office action dated Jun. 26, 2013 by Instituto Mexicano de la Propiedad Industrial for application MX/a/2012/012035.
Office action dated Oct. 15, 2013 by the China Patent Office for application No. 201180027439.8.
Office action dated Nov. 19, 2013 by the China Patent Office for application No. 201180027447.2.
Office action dated Dec. 3, 2013 by Japan Patent Office for application No. 2010-528972.

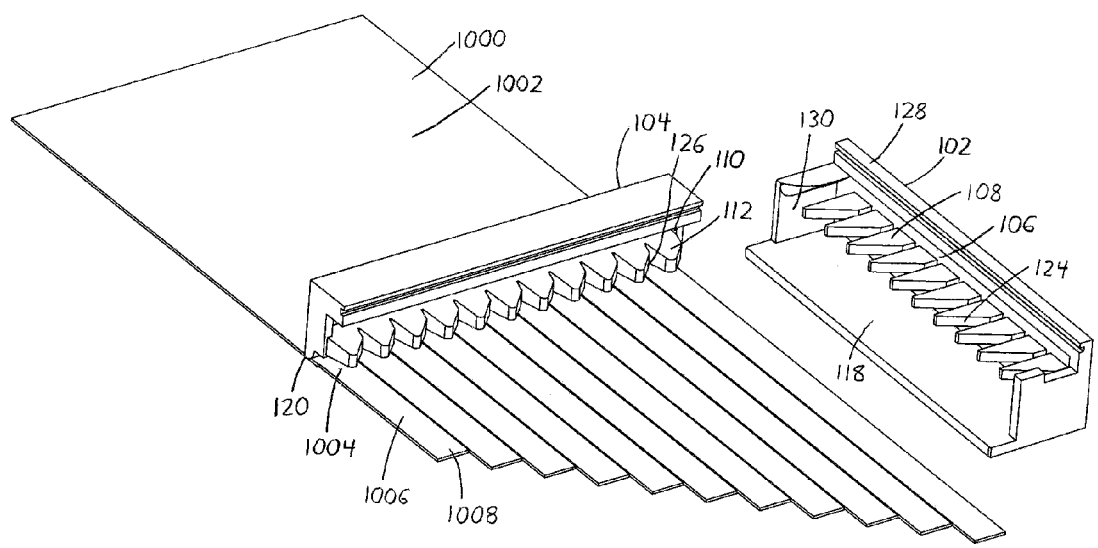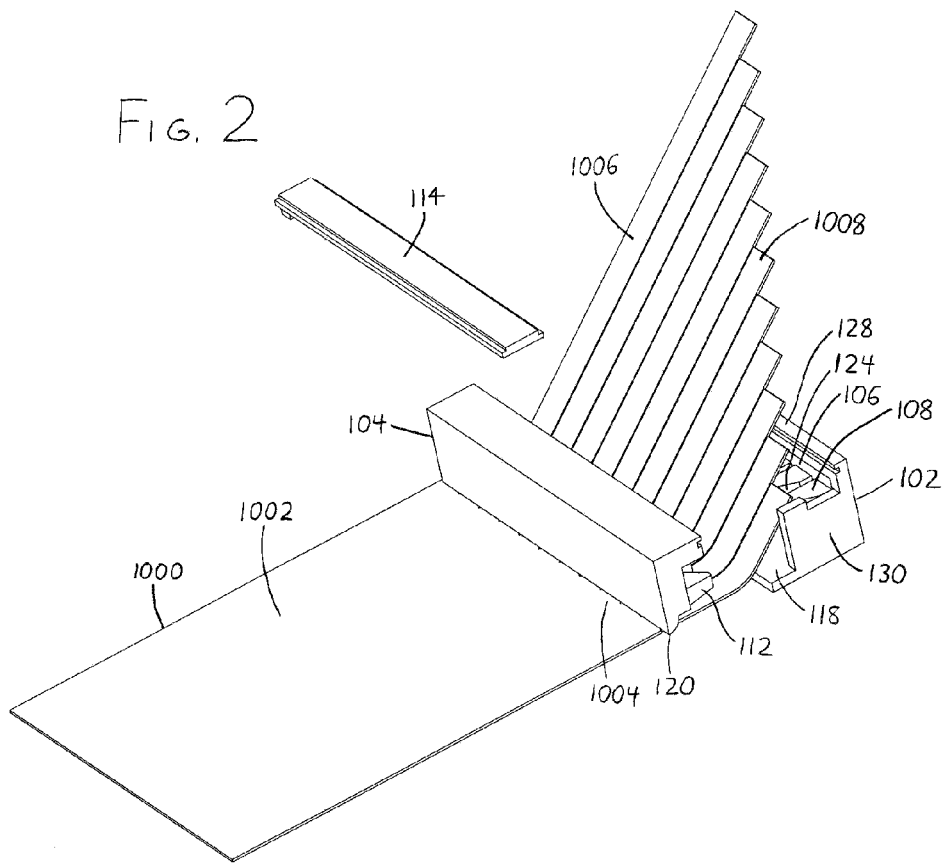

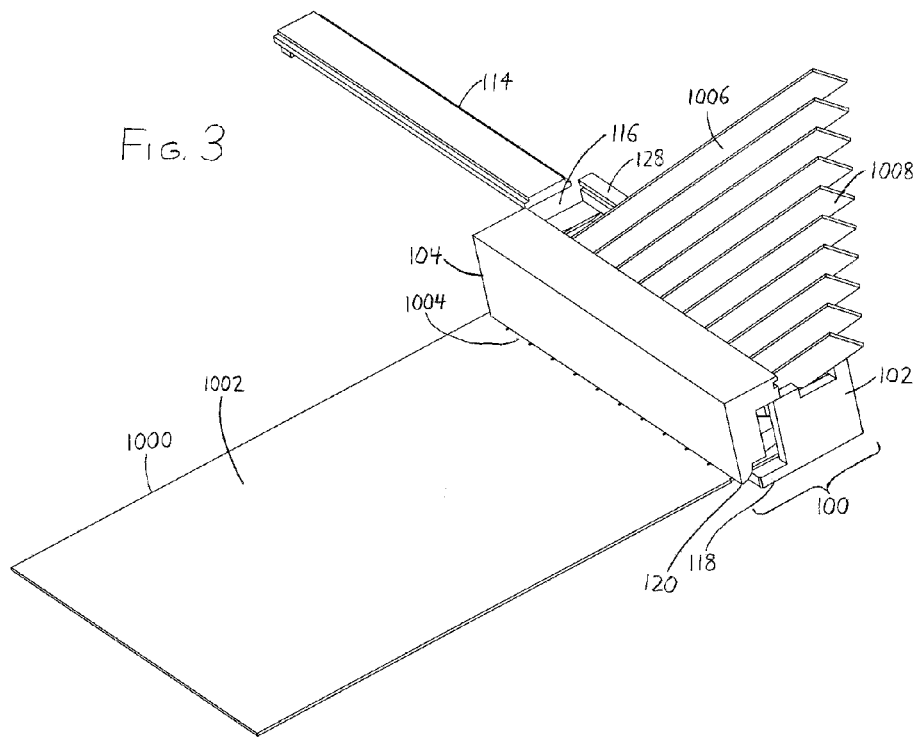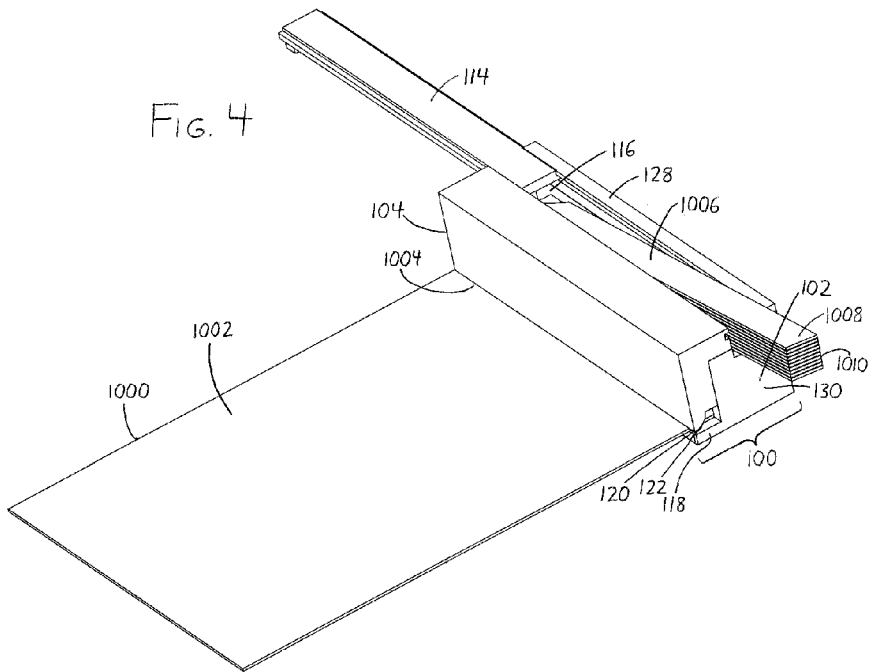

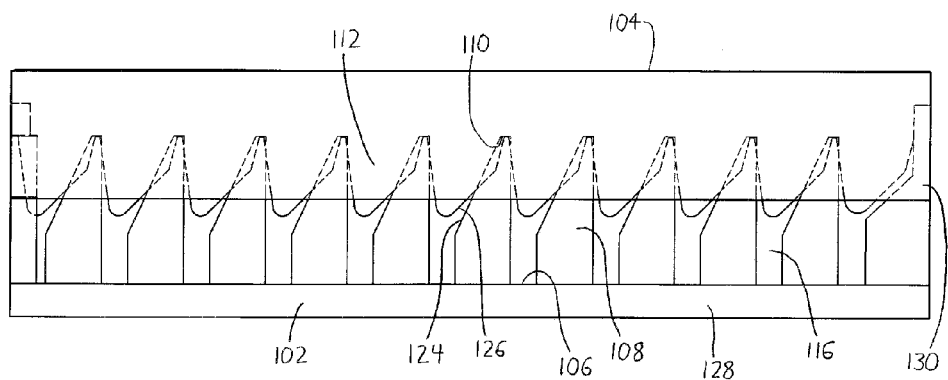
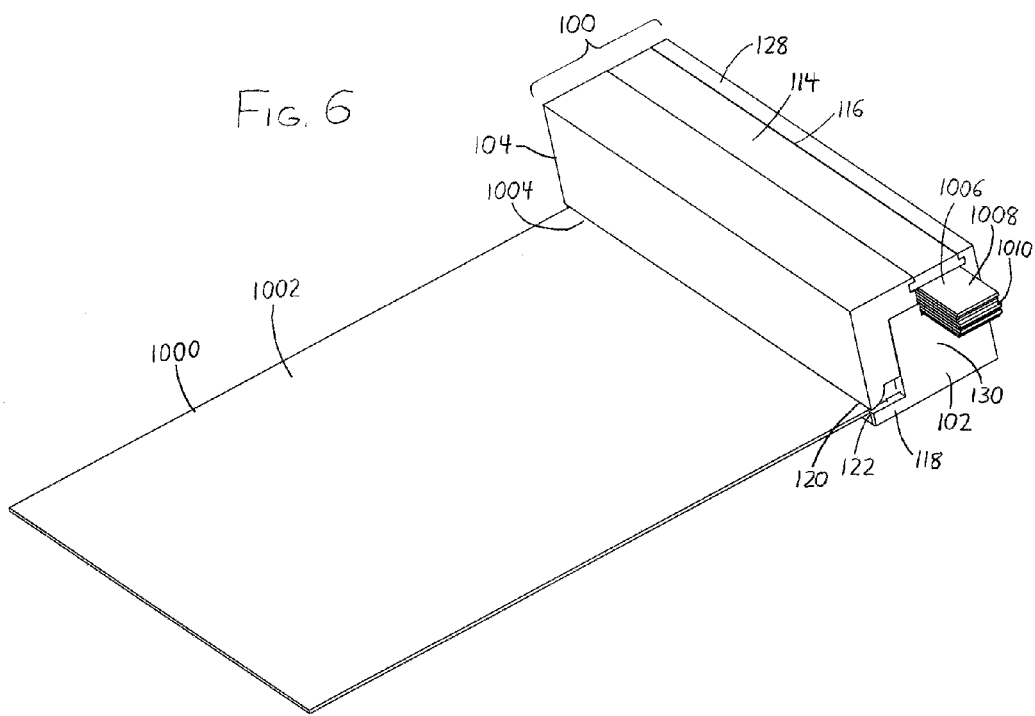

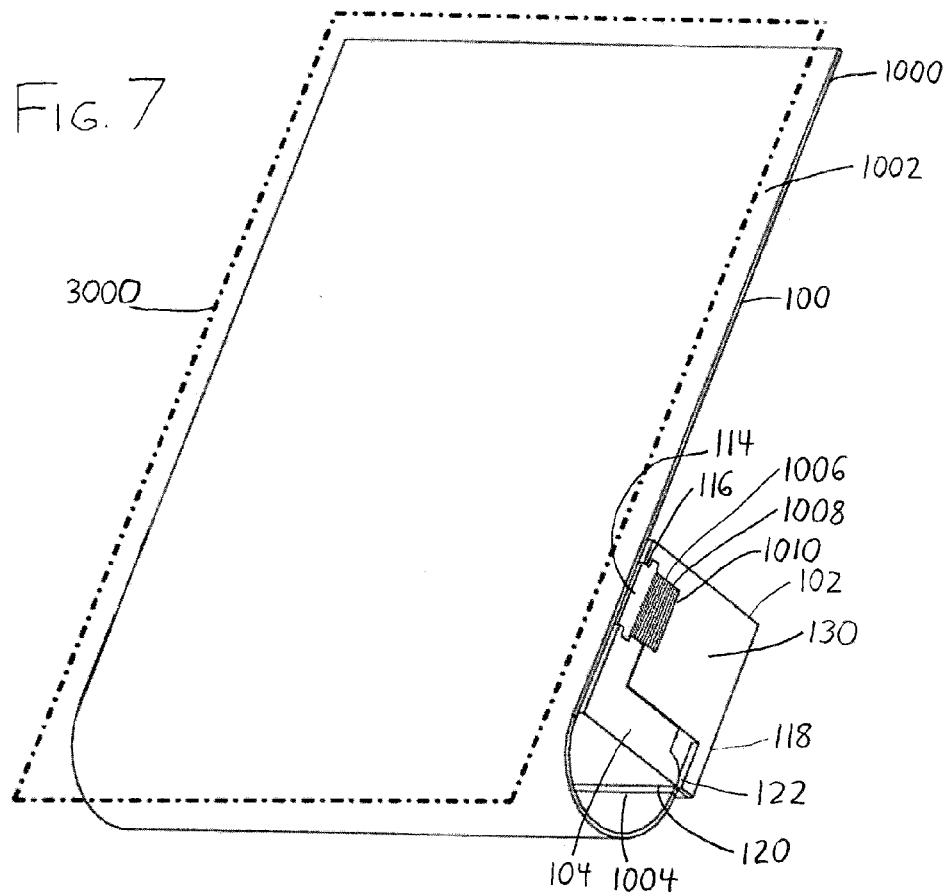
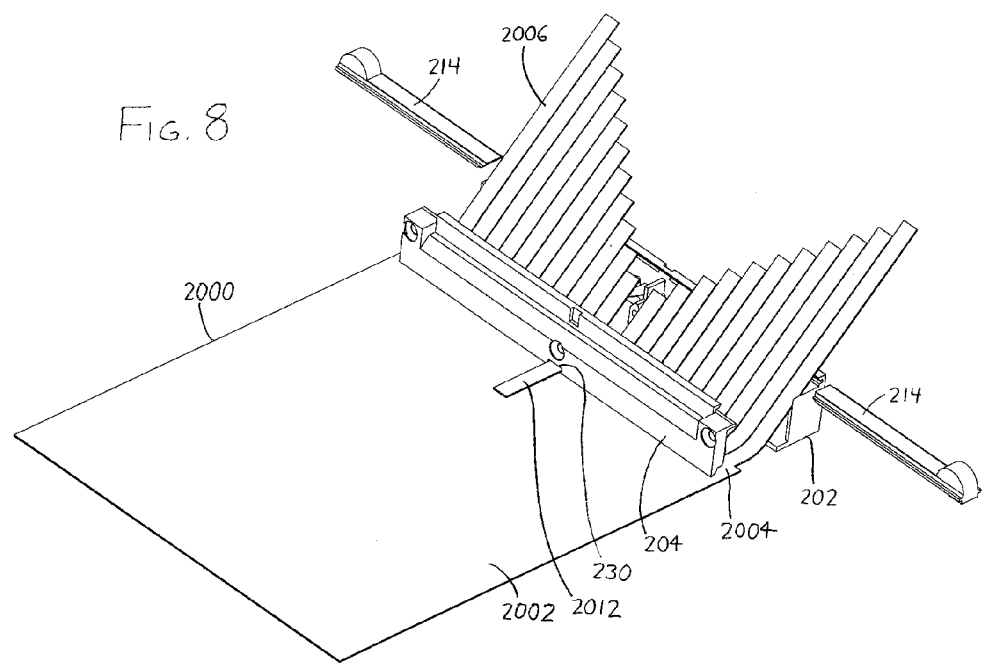

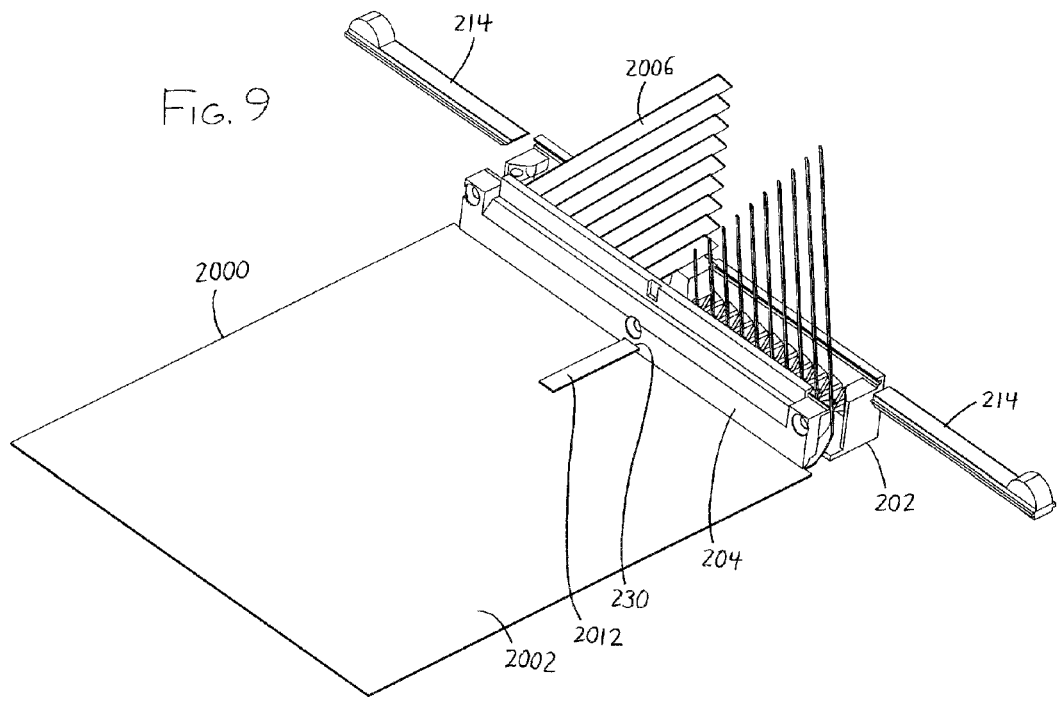
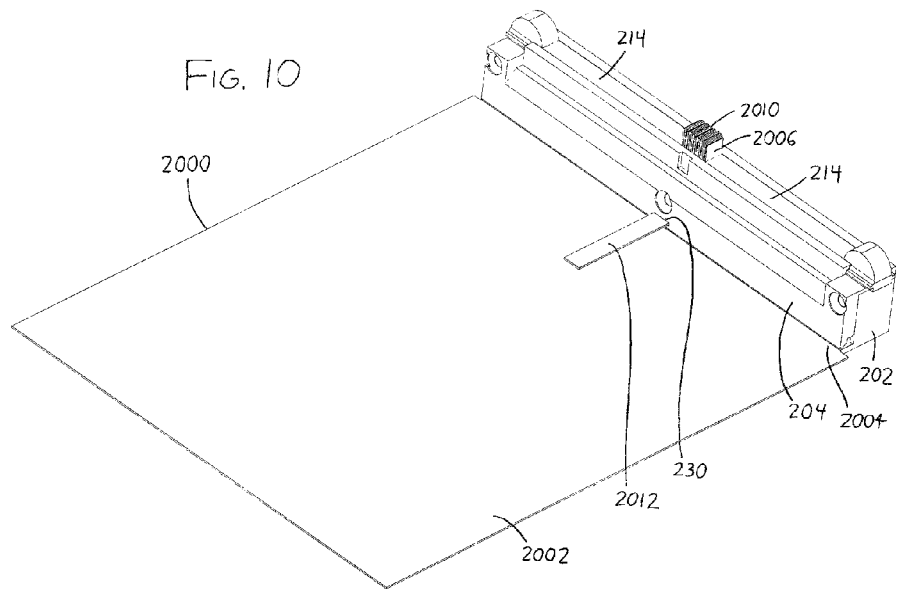

ILLUMINATION VIA FLEXIBLE THIN FILMS

CROSS-REFERENCE TO RELATED APPLICATIONS

This application claims priority under 35 USC§119(e) to the following U.S. Provisional Patent Applications:
U.S. Provisional Patent Application 61/147,215 filed 26 Jan. 2009
U.S. Provisional Patent Application 61/147,237 filed 26 Jan. 2009
The entireties of these applications are incorporated by reference herein.

FIELD OF THE INVENTION

This document concerns an invention relating generally to lightguides such as fiberoptic cable and edge-lit films, and more specifically to edge-lit film assemblies and devices and methods for their rapid assembly.

BACKGROUND OF THE INVENTION

As discussed in International (PCT) Publication No. WO 2009/048863, a light guide made of a flexible transparent film sheet can be formed wherein an edge of the sheet is cut or otherwise formed into parallel strips, with the strips then being folded/bent into a stacked array (generally shaped like an elongated beam) through which light can be directed to or from the major area of the sheet (i.e., the portion from which the strips extend). Similar arrangements are seen in U.S. Pat. No. 4,151,582 to Grunberger and U.S. Pat. No. 4,824,194 to Karasawa. So long as the bends of the strips are not too great (which can disrupt the internal reflection that promotes light transmission within the strips), and/or so long as the bent regions are coated to deter light loss at the bends, illumination of the end of the beam-like stack of strips (as with one or more LEDs) transmits light through the strips and into the major area of the sheet. The major area of the sheet can be treated to emit the light from all or a portion of the major area. Such an arrangement is useful for applications such as general illumination, illuminated signage, and backlighting and/or frontlighting of Liquid Crystal Displays (LCDs) or other displays. Conversely, light may be collected in the major area of the sheet and transmitted therein to the beam-like stack for reception by a photovoltaic or other device, which can be useful for applications such as light sensors and solar collectors. Thus, a point or concentrated light source (at the stacked strips) can be used to illuminate a large area (the major area of the sheet), or conversely light incident over a large area (at the major area of the sheet) can be concentrated into a small area (at the stacked strips). Such film light guides have significant advantages over light guides formed of rigid transparent plates or the like owing to their lower cost, size, and weight, and their increased flexibility.

Despite the foregoing advantages, illuminators of the foregoing types are rarely used, largely owing to difficulties with their manufacture. Accurate formation of the strips in the film sheet is accomplished easily enough, as by running an array of blades along a film sheet to an edge. However, it is then difficult and time consuming to properly bend and align the strips into a stacked array suitable for receiving light from a light source. If the bending is done by hand, it is time- and labor-intensive, and if done by machine, it is capital-intensive insofar as it is expensive and difficult to build folding machines which precisely bend the fingers without damage (particularly if the machine is to accommodate sheets of different sizes with different strip configurations). It would therefore be useful to have more efficient and economical devices and methods for constructing film illumination devices such as those described in the foregoing patents.

SUMMARY OF THE INVENTION

The invention involves a film illumination device which is intended to at least partially solve the aforementioned problems, and which may be assembled rapidly, easily, and inexpensively. To give the reader a basic understanding of some of the advantageous features of the invention, following is a brief summary of preferred versions of the film illumination device, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

Looking initially to FIG. 1, exemplary first and second frame members 102 and 104 are shown along with an exemplary film sheet 1000 to be illuminated. The film sheet 1000 has a major sheet area 1002 (shown oriented along a plane), and an adjacent minor sheet area 1004 from which an array of elongated adjacent film strips 1006 extend (also shown oriented along a plane), with the film strips 1006 extending along a (first) direction at least substantially parallel to each other to terminate in strip ends 1008. The first frame member 102 includes a first member inner face 106 with a protruding array of first member teeth 108, and the second frame member 104 having a second member inner face 110 which also preferably bears a protruding array of second member teeth 112. The first member teeth 108 are arrayed such that when the first and second frame members 102 and 104 are moved closely adjacent each other (a process shown in FIGS. 2-4) to form a frame 100 (with the completed frame 100 being shown in FIGS. 6-7), with the array of film strips 1006 situated between the first and second member inner faces 106 and 110 (and more particularly between the first member teeth 108 and the second member teeth 112, if any), each film strip 1006 is each urged by a first member tooth 108 and by the second frame member 104 (more particularly, by a second member tooth 112, if any) into a second direction different from the first direction, with the urged film strips 1006 being adjacently situated in at least substantially parallel planes (as best seen in FIG. 6). Thus, by simply sandwiching the strips 1006 between the frame members 102 and 104, the strips 1006 are aligned (see FIGS. 3-4) such that they can thereafter be urged in a direction aligned generally parallel to the first member inner face 106 to stack the strips 1006 (or at least the strip ends 1008) in abutting relationship. This step is shown in FIGS. 4 and 6, wherein the strips 1006 are urged by a cover member 114 (to be discussed in greater detail below) into a direction oriented at least substantially perpendicular to the first direction. The strips 1006 then have their strip ends 1008 aligned to define an at least substantially continuous surface 1010, or the strip ends 1008 can be cut (and possibly polished) to generate an at least substantially continuous surface 1010, which can then be illuminated to transmit light into the major sheet area 1002 (or conversely light collected along the major sheet area 1002 can be transmitted along the strips 1006 to the collected strip ends 1010).

The first and second frame members 102 and 104 are preferably designed to complementarily interfit with each other when moved into abutment about the film strips 1006 with the first and second member inner faces 106 and 110 facing each other (as best seen in FIGS. 4 and 6). The first and second frame members 102 and 104 may then be joined together by use of adhesives or the like, or they might be mechanically joined by inserting a fastener through aligned fastener apertures defined in the first and second frame members 102 and 104, and/or by providing complementary mating structures on the first and second frame members 102 and 104 (e.g., a barbed prong on the first frame member 102 which engages an aperture in the second frame member 104). When the frame members 102 and 104 are moved into abutment about the film strips 1006, they are also preferably configured to have an open top slot 116 defined therebetween (see FIG. 4), wherein the redirected strips 1006 extend through this top slot 116). A cover member 114 can then usefully be provided to slidably fit between the first and second frame members 102 and 104 along the top slot 116, such that sliding the cover member 114 between the first and second frame members 102 and 104 at least partially closes the top slot 116, and at the same time urges the film strips 1006 into an abutting parallel stacked relationship below the cover member 114 (as seen in FIGS. 4 and 6).

Similarly, the frame members 102 and 104 can bear structure which at least partially closes about the bottom of the interfit frame members 102 and 104, where the film strips 1006 enter the space therebetween. As best seen in FIG. 1, the first frame member 102 includes a first member floor 118 extending outwardly from the first member inner face 106. The second frame member 104 has a second member lower edge 120 below the array of second member teeth 112, with the second member lower edge 120 being situated above the first member floor 118 when the frame members 102 and 104 are interfit so as to define a gap 122 (see FIG. 6) into which the film strips 1006 may extend. The second member lower edge 120 is curved, having decreasing thickness as it extends downwardly, whereby film strips 1006 bearing against this lower edge 120 more easily bend about it as they extend upwardly between the inner faces 106 and 110 of the frame members 102 and 104, and thus between the first member teeth 108 and the second member teeth 112 (if any).

Referring to FIG. 1, each of the first member teeth 108 bear a first member tooth face 124 which is aligned obliquely in relation to the first member inner face 106. Similarly, each of the second member teeth 112 bear a second member tooth face 126 aligned obliquely in relation to the second member inner face 110. As then shown in FIG. 5, which shows the teeth 108 and 112 of the frame members 102 and 104 when the frame members 102 and 104 are situated as in FIG. 6, when the first and second frame members 102 and 104 positioned closely adjacent each other with the first and second member inner faces 106 and 110 facing each other in parallel relation, the first member tooth faces 124 and second member tooth faces 126 are aligned at least substantially parallel to each other (with the tooth faces 124 and 126 here being angled at approximately 15 degrees to each other, though other angles can be acceptable). Additionally, the array of first member teeth 108 is vertically spaced from the array of second member teeth 112, with the array of first member teeth 108 and the array of second member teeth 112 being situated at different heights above the second member floor (preferably with the array of second member teeth 112 being situated between the second member floor and the array of first member teeth 108). These arrangements cause the second member teeth 112 to promote the bending/redirection of the film strips 1006 caused by the first member teeth 108.

FIG. 7 then schematically illustrates a display panel 3000—e.g., a liquid crystal display, organic light-emitting diode display, or simply a sign formed of paper, plastic, and/or other materials—situated in such a manner that it might be backlit by the major sheet area 1002 of the film sheet 1000. The frame members 102 and 104 and film sheet 1000 are shown in a particularly preferred arrangement wherein the film sheet 1000 is bent approximately 180 degrees, with the frame members 102 and 104 and film strips 1006 being situated alongside and spaced from the plane of the major sheet area 1002. An arrangement of this nature is particularly useful because it effectively allows generation of an "edgeless" display: the display 3000, and the illuminating major sheet area 1002, need not be bounded by a light source or other matter which defines a frame about the area of the display and sheet (save for perhaps at the bent side of the major sheet, which is also the side at which any leads to the display would likely extend). This in turn allows a variety of space-saving and aesthetically attractive arrangements for matter such as televisions, computer screens, displays of portable devices such as mobile telephones and personal digital assistants, signage, and the like.

It is also possible that once an illumination device such as that in FIG. 6 is formed, the strips 1006 could be edge-adhered or otherwise held in a bundle, and the frame members 102 and 104 may then be removed. The invention therefore extends to "frameless" illumination devices which include a film sheet 1000 exemplified by that of FIG. 6, and formed by processes similar to those depicted in FIGS. 1-6, but wherein the frame members 102 and 104 are absent. In these situations, the frame members 102 and 104 essentially provide a temporary fixture used during assembly of the illumination device, but which are removed from the final illumination device.

In similar respects, the invention also extends to illumination devices consisting of frame members 102 and 104 alone, or to addition of the film sheet 1000 and completed assembly of the devices.

Further advantages, features, and objects of the invention will be apparent from the remainder of this document in conjunction with the associated drawings.

BRIEF DESCRIPTION OF THE DRAWINGS

FIG. 1 is a perspective view of an exemplary first frame member 102, an exemplary second frame member 104, and an exemplary film sheet 1000 having film strips 1006 extending from major sheet area 1002, with these components being assembled as shown in FIGS. 2-4 to generate an exemplary illumination device as in FIGS. 6-7.

FIG. 2 is a perspective view of the first frame member 102, second frame member 104, and film sheet 1000 of FIG. 1, wherein the frame members 102 and 104 are being urged toward each other about the film strips 1006 to begin bending the film strips 1006 into parallel relation.

FIG. 3 is a perspective view continuing from FIG. 2, wherein the frame members 102 and 104 are further urged toward each other to further bend the film strips 1006 into parallel relation.

FIG. 4 is a perspective view continuing from FIG. 3, wherein a cover member 114 is beginning advancement alongside the frame members 102 and 104 to bend the parallel film strips 1006 into abutting stacked relationship.

FIG. 5 is a top view of the frame members 102 and 104 as they are moved together into abutment, showing the relative locations of their first member teeth 108 and second member teeth 112.

FIG. 6 is a perspective view continuing from FIG. 4, showing an illumination device resulting after the cover member 114 has completed bending the film strips 1006 into abutting stacked relationship to generate a strip stack 1010.

FIG. 7 is a perspective view showing the illumination device of FIG. 6 with the film sheet 1000 bent to situate the frame 100 and strip stack 1010 behind the major area 1002 of the film sheet 1000, and with the major area 1002 of the film sheet 1000 illuminating a display panel 3000.

FIG. 8 is a perspective view of an exemplary first frame member 202, an exemplary second frame member 204, and an exemplary film sheet 2000 having a major sheet area 2002 and an adjacent minor sheet area 2004 from which film strips 2006 extend, with these components being assembled as shown in FIG. 9 to generate an exemplary illumination device as in FIG. 10.

FIG. 9 is a perspective view of the first frame member 202, second frame member 204, and film sheet 2000 of FIG. 8, wherein the frame members 202 and 204 are urged toward each other to bend the film strips 2006 into two arrays of parallel strips.

FIG. 10 is a perspective view continuing from FIG. 9, showing an illumination device resulting after cover members 214 have bent the film strips 2006 into abutting stacked relationship to generate a strip stack 2010.

DETAILED DESCRIPTION OF PREFERRED VERSIONS OF THE INVENTION

Expanding on the Summary above, film sheets used in the invention are preferably clear, low-light-absorption films which exhibit minimal light-scattering. Polycarbonate film of 0.05 mm to 1 mm thickness is an inexpensive and commonly available film which is suitable for use in the invention, but any film (e.g., polystyrene, polyester, acrylic or others) might be usable as well depending on the application to which the invention is to be applied. To deter light loss (promote internal reflection/transmission), the film can be coated/cladded with material having a lower refractive index than the film, preferably as low of a refractive index as economically possible while still yielding good adhesion between the coating and the film. Any applied coating is preferably as thin as possible to conserve size and costs, and to maximize light intake at the strip stack (shown at 1010 in FIGS. 6-7), if the strip ends 1008 are coated in addition to the remainder of the film sheet 1000. In this respect, a polycarbonate film with 0.5 mm thickness and a TC106 coating (Sun Process Corporation, Mt. Prospect, Ill., USA) of 0.01 mm thickness works well for most applications, with only 2% of the cross-section of the strip stack being occupied by the clad.

Strips 1006 (e.g., FIG. 1) can be cut in a film sheet 1000 in any suitable manner. An exemplary manufacturing process involves feeding film from a roll through tension rollers; using a knurl roll to imprint a light extraction pattern; applying an array of blades that raise and lower into the film to cut the strips; and a cutoff mechanism which cuts the film and its strips to a desired final length to generate a film sheet as exemplified at 1000 in FIG. 1. Heating stations can assist in softening the film to apply the light extraction pattern and to cut the film. Cutting is preferably performed using blades which are sufficiently sharp and smooth that they result in optically smooth cut edges (i.e., edges with minimal irregularities from which light loss might occur). Blade coatings, e.g., ceramic or fluoropolymer coatings, can enhance blade smoothness.

Once the strips are aligned in a stack (e.g., as at 1010 in FIGS. 6-7), the stack end 1010 is preferably cut and polished, or otherwise processed, to provide an optically smooth coupling surface to which light can be supplied from a light source (or from which a sensor or the like can receive light) with minimal loss. As examples of such processing, cutting and sanding/polishing can achieve such a surface, or flame or chemical polishing might be used with appropriate film materials.

Frame members such as 102 and 104 in FIGS. 1-7 can be made of any suitable materials, with plastic and metal materials being readily molded or machined to construct the frame members. If the film used in an illumination device is electrochromic, or otherwise has transmission, absorption, and/or reflection properties which are designed to vary with an applied voltage, current, frequency, or other input signal, it can be useful to form one or more of the frame members of a conductive material through which the input signal can be applied. The interior surfaces of the frame members can usefully be coated with a reflective material so that any light lost from the film strips to the interior of the frame might be reflected therein, and possibly redirected back into the strips.

The frame members and film sheets discussed above may have vastly different configurations than those shown in the drawings. The shapes, sizes, and proportions of the frame members, in particular the numbers, shapes, sizes, and proportions of their teeth, are design parameters which depend on the desired size of the illumination device, the numbers, sizes, and desired curvatures of the film strips, and similar factors. For example, a film sheet 20 cm wide with a thickness of 0.01 cm can be cut into fingers having 0.5 cm width to result in a strip stack (as at 1010 in FIGS. 6-7) having a light input (or receiving) surface of roughly 0.4 cm by 0.5 cm in size. Films suitable for use in the invention, and which are inexpensive and commonly available (at least at the time this document was prepared), tend to have superior light transmission where any strips are bent with radii of curvature which are at least approximately eight times the film thickness. (Lesser radii are possible—for example, strips can be bent with nearly negligible radii of curvature—but these tend to require surface coatings or similar measures at the bends to decrease light loss, which can increase costs.) Thus, in general, the frame members will have a height of at least eight times the film thickness, plus the overall strip stack thickness (assuming the stack is to extend within/between the frame members, as within the top slot 116 in FIGS. 4 and 6). Similarly, the depth of the combined frame members will generally be approximately the width of the top slot (which is preferably the same as the maximum strip width), plus approximately 1.4 times the bending radius.

Frame members and illumination devices can also vary from those discussed above and shown in the figures in details other than their shapes, sizes, and proportions. To illustrate, FIGS. 8-10 illustrate first and second frame members 202 and 204 wherein the first frame member 202 urges the film strips 2006 into two arrays of adjacently-situated strips situated in parallel planes, and a pair of cover members 214 then urge these arrays into a stack extending from the center of the lengths of the stack members. When the film sheet 2000 is then bent similarly to that in FIG. 7, but at an angle of approximately 90 degrees rather than 180 degrees, the stacked strips 2010 extend behind the major area 2002 of the film sheet 2000, rather than outwardly from one of its sides (as in FIGS. 6-7). This may allow for a more compact and/or convenient arrangement, depending on how the illumination device is to be used. Additionally, a film sheet may bear strips extending from more than one of its edges—e.g., from opposing edges—and frames may be mounted about each of these edges so that the major area of the sheet can be illuminated from more than one edge. Such an arrangement is particularly preferred where the major sheet area is large, since illumination from multiple edges can provide greater illumination of the major sheet area. In similar respects, two or more frames can be mounted on a single edge of a film sheet to provide two or more strip stacks for input of light to, or output of light from, the major sheet area.

The teeth used on the frame members need not take the forms of those illustrated in the drawings (e.g., FIGS. 1 and 5), which have a roughly sawtooth profile, with a thickness that increases slightly as each tooth extends from its tip to its base in the vertical direction. Examples of other teeth configurations include tetrahedra, rod-like forms (similar to an array of comb teeth, but wherein the teeth might be are angled with respect to their frame members), and flanges having a C-shaped or J-shaped curve. Further, the teeth might be situated at different locations along the heights of the frame members, as by being located at the first member top edge 128 in FIG. 1 (though in this case any stack of parallel abutting film strips would rest atop the first frame member 102, rather than in a slot 116 defined between the first and second slot members 102 and 104, as in FIGS. 4 and 6), In such situations, the first member teeth 108 might be defined by forming notches/depressions in the first member top edge 128 and/or the first member inner face 106, such that the first member teeth 108 are left to protrude both upwardly and outwardly from the first member inner face 106. Similar adaptations could be made when providing the second member teeth on the second frame member. Depending on the configuration and location of the teeth, the width of the film strips, and on the degree of bending desired for the strips, the faces of the teeth need not be near parallel (as in FIG. 5, which shows the tooth faces 124 and 126 angled at approximately 15 degrees to each other), and in fact could be more perpendicular than parallel. However, for frame members and strips configured and proportioned as in the accompanying drawings, tooth faces which are parallel (or nearly so) are preferred.

As noted previously, the second member teeth help promote the bending/redirection of the film strips caused by the first teeth. This is not necessary, and the second member teeth may be omitted, or might simply be replaced by a single continuous ridge or other member rather than being provided as a series of independent teeth.

Further, while the frame members are depicted in the Figures as having linear arrays of teeth which redirect a planar array of film strips into a stacked array of strips, the arrayed teeth need not necessarily be linear, nor need the film strips input to the teeth be necessarily arrayed in a plane. In some applications (e.g., architectural lighting), curved film sheets and/or strip stacks, or sheets/stacks having other complex shapes, are sometimes desired. Thus, the frames can be constructed in such a manner that they might receive a curved/nonplanar array of strips. In this respect, the frame members illustrated in the accompanying drawings might be formed of a flexible material such as silicone whereby a final illumination device (as shown in FIGS. 7 and 10) might be bent to at least partially conform to a curved surface.

The construction of illumination devices such as those shown in FIGS. 7 and 10 also need not be done solely by hand, and may be done in an automated or semi-automated manner. To illustrate, the frame members 102 and 104 of FIGS. 1-7 could be defined as portions of a machine wherein a sheet is fed below the second frame member 104 (with an edge then being cut into film strips, if it is not already so cut), and the frame members 102 and 104 are then moved by a suitable mechanism in the manner shown in FIGS. 1-7 to construct the illumination device of FIG. 7. Stated differently, the invention also encompasses frame members which are provided as part of a further device which assists in the assembly of a final illumination device.

Frame members can also include other features. As one example, a frame member may include ports through which gels having a low refractive index, or other materials, may be injected to at least partially surround the film strips within the frame and better deter light loss from the strips. As another example, the frame members can be adapted such that the stacked strips do not extend therefrom, and rather terminate within the frame members at a location at which an LED or other light source (or light sensing/receiving device) is provided. In other words, the light source (or light receiver) can be provided within the frame, as well as any power supplies or other components needed for its operation. The frame members may include features allowing them to be quickly and easily attached and detached to each other, and/or to surrounding structure, and about a film sheet, whereby film sheets may be more easily removed from the frame members and replaced with other desired film sheets (e.g., where a film sheet defining a sign bearing one message is to be replaced by a sign bearing another message). Alternatively, the frame members may bear structure for quick and easy attachment to surrounding structure, whereby an illumination device such as that in FIG. 7 may be readily removed and replaced in its entirety by another illumination device.

One issue that can be encountered with the frame members discussed above is that if the film sheet is not held with respect to the first frame member (and/or the second frame member) as the aforementioned assembly steps are followed, the film sheet and its strips can displace, making it more difficult to complete the assembly of the illumination device. Features can be added to one or more of the frame members to help deter such displacement. One example is illustrated in FIG. 8, wherein the second frame member 204 bears a central strip aperture 230 along its length, and situated below the second member teeth (not shown). As shown in FIGS. 8-10, a central film strip 2012 extending from the film sheet 2000 may be bent to extend through this central strip aperture 230, thereby at least partially restraining the film strips 2006 and film sheet 2000 with respect to the second frame member 204 as it is moved toward the first frame member 202 to bend the strips 2006 into arrays of parallel spaced strips (as in FIG. 9). After the illumination device has been fully assembled (FIG. 10), the end of the central film strip 2012 protruding from the second frame member 204 may be cut off or otherwise removed.

As another example, one or more of the frame members—most preferably the first frame member—might include pegs or other protruding structure (e.g., on the first member floor), and the film sheet may then bear apertures, or its edges may bear notches, which receive the protruding structure(s). As a result, the film sheet can be placed in the first frame member with the protruding structure(s) deterring slipping of the film sheet as the second frame member is urged toward the first frame member.

Protruding structure(s), and complementary receiving structures such as aperture(s)/slot(s), are not the only structures that can be used to accomplish such a restraining arrangement, and a variety of other arrangements could alternatively or additionally be used. Referring to FIG. 1 to illustrate, tacky/adhesive surfaces, or elastomeric or other highfriction surfaces, can be situated on the frame members 102 and 104 (e.g., along the first member floor 118 and/or the second member lower edge 120) to deter slippage of the film sheet as the frame members 102 and 104 are sandwiched about the strips. As another example, tongues/clips could extend outwardly from the first member sidewalls 130 to extend closely adjacent the first member floor 118, so that the outermost film strips can be slid between the tongues/clips and the first member floor 118 to restrain the sheet with respect to the first frame member 102.

Sheet restraining arrangements can also or alternatively be used wherein the arrangements do not require additional structure on the frame members, and/or modification of the film sheet. To illustrate, the frame member(s) might bear apertures along the first member floor and/or along the second member lower edge, with these apertures being temporarily connected to a vacuum supply while the film strips are being urged by the frame members into a stacked array. The vacuum supply may thereafter be removed after the illumination device is sufficiently complete.

It should be understood that various terms used throughout this document to refer to orientation and position—e.g., "top" (as in "top slot"), "lower" (as in "second member lower edge"), "vertically," and the like—are relative terms rather than absolute ones. In other words, it should be understood (for example) that the top slot being referred to may in fact be located at the bottom of the device depending on the overall orientation of the device. Thus, such terms should be regarded as words of convenience, rather than limiting terms.

To provide a more specific illustration of the invention, following is a description of an exemplary illumination device resembling that of FIG. 7, used to illuminate an LCD television display having a 20-inch (50 cm) diagonal dimension. Clear polycarbonate film having 0.01 inch (0.025 cm) thickness, provided on a roll 48 inches (122 cm) wide, was cut to 16 by 40 inch (41 by 102 cm) subsections. An array of blades cut strips in the film 0.733 inches (1.86 cm) wide by 20 inches (50 cm) long. Frame members (and a cap member) having a configuration resembling that in FIGS. 1-6 were used to define a completed illumination device as depicted in FIG. 6, and glue was used to bond the frame members together (and to the stacked strip ends), and to seal the interior of the frame from dust. The stacked strip ends were cut so that their tips extended along a common plane, and were then sanded with 100 and 320 grit sandpaper, followed by using a micro-mesh sanding kit. This resulted in an optically smooth input surface measuring approximately 0.733 inches (1.86 cm) by 0.2 inches (0.51 cm). Light was coupled into the input surface using a PT-120 PhlatLight (Luminus Devices, Billerica, Mass., USA). The major area of the film sheet was placed behind the LCD display, and the film sheet was bent from the state shown in FIG. 6 to that shown in FIG. 7 to situate the light source, heatsinks, fans, optics and electronics behind major area of the film sheet. The radius of curvature in the bend was 0.25 inches (0.64 cm), which is approximately 25 times the thickness of the film, resulting in negligible light leakage at the bend. The overall thickness/depth of the LCD display and the illumination device was approximately 1.25 inches (3.2 cm), primarily owing to the size of the heatsinks. The illumination device provided illumination to the display which appeared to be at least equivalent in quality to that provided by common prior methods, e.g., backlighting or frontlighting by Cold Cathode Fluorescent Lamps (CCFL) and/or Light Emitting Diodes (LEDs).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A film illumination device comprising:
   a. a first frame member having a first member inner face with a protruding array of first member teeth; and
   b. a second frame member having a second member inner face,
   wherein the first member teeth are arrayed such that when the first and second frame members are moved closely adjacent each other with an array of elongated adjacent film strips situated between the first and second member inner faces, with the film strips extending in a first direction at least substantially parallel to each other and being oriented in an at least substantially common plane, the film strips are urged by a first member tooth into a second direction different from the first direction, with the urged film strips being adjacently situated in at least substantially parallel planes.

2. The film illumination device of claim 1 wherein:
   a. the second member inner face bears a protruding array of second member teeth, and
   b. the first and second member teeth are arrayed such that when the first and second frame members are moved closely adjacent each other with an array of elongated adjacent film strips situated between the first and second member teeth, with the film strips extending in a first direction at least substantially parallel to each other and being oriented in an at least substantially common plane, the film strips are urged by a first member tooth and a second member tooth into a second direction different from the first direction, with the urged film strips being adjacently situated in at least substantially parallel planes.

3. The film illumination device of claim 2 wherein the first and second frame members:
   a. are joined together with the first and second member inner faces facing each other, and
   b. the array of first member teeth is spaced from the array of second member teeth.

4. The film illumination device of claim 2 wherein:
   a. the first and second frame members are joined together with the first and second member inner faces facing each other,
   b. the first frame member includes a first member floor extending outwardly from the first member inner face,
   c. the second frame member has a second member lower edge below the array of second member teeth, the second member lower edge being situated above the first member floor, and
   d. the array of first member teeth and the array of second member teeth are situated at different heights above the first member floor.

5. The film illumination device of claim 4 wherein the array of second member teeth is situated between the first member floor and the array of first member teeth.

6. The film illumination device of claim 4 wherein the second member lower edge is curved, whereby it has decreasing thickness as it extends downwardly.

7. The film illumination device of claim 4:
   a. wherein the first and second frame members have an open top slot defined therebetween, the open top slot being situated above the array of first member teeth and the array of second member teeth, and
   b. further comprising a cover member configured to slidably fit between the first and second frame members along the top slot.

8. The film illumination device of claim 4 wherein the first and second frame members complementarily interfit with each other when moved into abutment with the first and second member inner faces facing each other.

9. The film illumination device of claim 8:
   a. wherein the first and second frame members have an open top slot defined therebetween when moved into complementarily interfitting abutment with the first and second member inner faces facing each other, and
   b. further comprising a cover member removably fit with respect to the first and second frame members to at least partially close the top slot.

10. The film illumination device of claim 1 wherein the first and second frame members:
    a. are joined together with the first and second member inner faces facing each other, and
    b. include at least one of:
       (1) a portion of one of the first and second frame members complementarily mated with the other of the first and second frame members; and
       (2) aligned fastener apertures in the first and second frame members.

11. The film illumination device of claim 1 in combination with a film sheet, the film sheet having an array of elongated adjacent film strips extending therefrom:
    a. in a first direction at least substantially parallel to each other, and
    b. oriented in an at least substantially common plane,
    wherein the film strips are situated between the first and second frame members, with each of the film strips being urged by a first member tooth into a second direction different from the first direction, with the urged film strips being adjacently situated in at least substantially parallel planes.

12. The film illumination device of claim 11 wherein:
    a. the film strips terminate in strip ends, and
    b. the urged film strips are adjacently situated in abutment in parallel planes at their strip ends.

13. The film illumination device of claim 11 wherein the urged film strips are adjacently situated in abutment in parallel planes.

14. The film illumination device of claim 13 wherein the abutting film strips extend in a direction oriented at least substantially perpendicular to the first direction.

15. The film illumination device of claim 11 further comprising a cover member engaged to the first and second frame members to slide atop a slot defined between the first and second frame members.

16. The film illumination device of claim 11:
    a. wherein:
       (1) the second member inner face includes a protruding array of second member teeth, and
       (2) the first and second frame members have an open top slot defined therebetween, the open top slot being situated above the array of first member teeth and the array of second member teeth, and
    b. further comprising a cover member fit atop the top slot, wherein the urged film strips are stacked in abutting parallel relationship below the cover member.

17. The film illumination device of claim 11 wherein the film sheet includes:
    a. a major sheet area oriented along a plane, and
    b. an adjacent minor sheet area from which the film strips extend, the minor sheet area being bent, with the frame members being situated spaced from the plane along which the major sheet area is oriented.

18. The film illumination device of claim 17 further comprising a display panel extending parallel and adjacent to the major sheet area.

19. The film illumination device of claim 11 wherein the film sheet:
    a. has a major sheet area oriented along a plane, and
    b. is bent by at least ninety degrees, with the frame members being situated
       (1) alongside, and
       (2) spaced from the plane of the major sheet area.

20. A film illumination device comprising:
    a. a film sheet having:
       (1) an at least substantially planar major sheet area; and
       (2) an adjacent minor sheet area with a series of elongated adjacent film strips extending therefrom, the film strips being situated:
          i. in an at least substantially common plane, and
          ii. at least substantially parallel to each other in a first direction; and
    b. a frame including:
       (1) a first frame member having a first member inner face with a protruding array of first member teeth; and
       (2) a second frame member having a second member inner face, wherein the first and second frame members are affixed about the film strips, with the film strips each being urged by a first member tooth into an array wherein the urged film strips are:
          i. adjacently situated in at least substantially parallel planes, and
          ii. oriented in a second direction different from the first direction.

21. The film illumination device of claim 20 wherein:
    a. the minor sheet area is bent relative to the major sheet area by at least ninety degrees, and
    b. the film strips join the minor sheet area at a location spaced from the plane along which the major sheet area rests.

22. A film illumination device comprising:
    a film sheet having:
    a. an at least substantially planar major sheet area; and
    b. an adjacent minor sheet area with a series of elongated film strips:
       (1) first extending from the major sheet area with the film strips oriented:
          i. adjacently in an array,
          ii. in an at least substantially common plane, and
          iii. at least substantially parallel to each other in a first direction, and
       (2) then extending with the film strips oriented:
          i. adjacently to each other in at least substantially parallel planes, and
          ii. in a second direction different from the first direction, the minor sheet area being bent in relation to the major sheet area by at least ninety degrees, with the film strips joining the minor sheet area at a location spaced from the plane along which the major sheet area is oriented; and
    a frame including:
    a. a first frame member with an array of first member teeth protruding from a first member inner face; and
    b. a second frame member with a second member inner face,
    wherein the first and second frame members are affixed about the film strips, with each film strip each being urged by a first member tooth from the first direction into the second direction.

23. The film illumination device of claim 22 wherein:
a. the film strips terminate in strip ends, and
b. the urged film strips are adjacently situated in abutment in parallel planes at their strip ends.

24. The film illumination device of claim 23 wherein the strip ends are aligned to define an at least substantially continuous surface.

* * * * *